(12) United States Patent
Enenkiel (10) Patent No.: US 8,069,140 B2
(45) Date of Patent: Nov. 29, 2011

(54) SYSTEMS AND METHODS FOR MIRRORING THE PROVISION OF IDENTIFIERS

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 317 days.

(21) Appl. No.: 11/541,725

(22) Filed: Oct. 3, 2006

(65) Prior Publication Data

US 2007/0106673 A1 May 10, 2007

Related U.S. Application Data

(60) Provisional application No. 60/722,417, filed on Oct. 3, 2005.

(51) Int. Cl.
*G06F 7/00* (2006.01)

(52) U.S. Cl. ......... 707/610; 707/611; 707/612; 707/634

(58) Field of Classification Search ............ 707/10, 707/3, 100, 104.1, 614, 610–612, 634; 711/162; 714/43; 709/218

See application file for complete search history.

(56) References Cited

U.S. PATENT DOCUMENTS

| | | | |
|---|---|---|---|
| 6,625,705 B2 * | 9/2003 | Yanai et al. | 711/162 |
| 6,631,411 B1 * | 10/2003 | Welter et al. | 709/224 |
| 6,931,444 B2 * | 8/2005 | Schweitzer | 709/224 |
| 7,124,062 B2 * | 10/2006 | Gebhart | 702/186 |
| 7,130,891 B2 * | 10/2006 | Bernardin et al. | 709/218 |
| 7,194,488 B2 * | 3/2007 | Highleyman et al. | 1/1 |
| 7,222,121 B2 * | 5/2007 | Casati et al. | 707/100 |
| 7,299,244 B2 * | 11/2007 | Hertling et al. | 707/104.1 |
| 2002/0116669 A1 * | 8/2002 | Jain | 714/43 |
| 2002/0169889 A1 * | 11/2002 | Yang et al. | 709/244 |
| 2003/0033270 A1 | 2/2003 | Budka et al. | |
| 2004/0098411 A1 * | 5/2004 | Highleyman et al. | 707/104.1 |
| 2004/0230572 A1 * | 11/2004 | Omoigui | 707/3 |
| 2005/0033833 A1 * | 2/2005 | Baldiga et al. | 709/222 |
| 2005/0044194 A1 * | 2/2005 | Baldiga et al. | 709/223 |
| 2005/0108170 A1 * | 5/2005 | Hailpern et al. | 705/51 |
| 2005/0114271 A1 * | 5/2005 | Sindambiwe | 705/67 |

FOREIGN PATENT DOCUMENTS

| | | |
|---|---|---|
| EP | 0 813 325 A2 | 12/1997 |
| EP | 1 533 701 A1 | 5/2005 |
| JP | 2005092872 A * | 4/2005 |

OTHER PUBLICATIONS

Douglas Brian, UDDI Version 2.04 API Specification, Jul. 2002.*
Armando Fox, Cluster-Based Scalable Network Services, Dec. 1997.*
Communication and Search Report from the European Patent Office, dated Dec. 28, 2006 (7 pages).

* cited by examiner

*Primary Examiner* — Tim T. Vo
*Assistant Examiner* — Gary Koo
(74) *Attorney, Agent, or Firm* — Finnegan, Henderson, Farabow, Garrett & Dunner, LLP (57) ABSTRACT

Systems, methods, and computer program products are provided for facilitating the assigning, generating, managing, and distributing of identifiers. In one implementation, a system is provided that comprises a first Web service for returning an identifier to a requester in response to an identifier request of the requester. The system also comprises a second Web service for mirroring identifiers that have been returned by the first Web service.

15 Claims, 10 Drawing Sheets

SYSTEMS AND METHODS FOR MIRRORING THE PROVISION OF IDENTIFIERS

CROSS-REFERENCE TO RELATED APPLICATION

This application claims the benefit of priority from U.S. Provisional Application No. 60/722,417, entitled "Data Processing Systems and Methods for Mirroring the Provision of Identifiers," filed on Oct. 3, 2005, the disclosure of which is expressly incorporated herein by reference to its entirety.

TECHNICAL FIELD

The present invention generally relates to the field of data processing. More particularly, and without limitation, the invention relates to Web services for facilitating the assigning, generating, managing, and distributing of identifiers for data processing tasks.

BACKGROUND INFORMATION

Identifiers are required for the performance of many data processing tasks, especially transactional data processing tasks. For example, an identifier is often assigned to a customer, a purchase order, an invoice, a transaction and/or another logical or physical entity for the purpose of administration and/or data processing. Such identifiers have some level of uniqueness that corresponds to the purpose of the identifier. Further, some identifiers are globally unique whereas other identifiers are unique only within a certain defined field of application.

Identifiers are also used in enterprise resource planning (ERP) systems, such as the SAP R/3 system, SAP ERP or SAP CRM, commercially available from SAP AG (Walldorf, Germany). For example, in the R/3 system every document that is administered and processed by the system can be assigned a document number that is unique for a company within a fiscal year. Various number ranges are used to define how the document number is generated and assigned.

Such document numbers serve as identifiers and can be assigned externally or internally. For external assignment, an accounting clerk enters the number of the original document during a document entry, or the number is transferred automatically from a pre-invoicing system.

A prerequisite for the external assignment is that the document numbers are unique. For internal assignment, the system automatically assigns a sequence number and the accounting clerk manually records this number on the original document. This method is used if the original documents do not have an unique document number, for example, with vendor invoices.

In view of the foregoing, there is a need for systems and methods that facilitate the assignment of identifiers, especially in a distributed data processing system, while reducing or avoiding the need for manual system interaction. Such solutions should facilitate the automatic provision of identifiers in a distributed data processing system. For example, a number of transactional computer systems may be coupled to the Web service. When a transaction number is required, a corresponding request may be generated and sent from one of the transactional computer systems to the Web service. In response to the identifier request, the Web service may return a unique transaction number. Depending on the implementation, the transaction number may be unique with respect to the requesting transactional computer system, within a certain task area or kind of transaction, or it may also be globally unique.

SUMMARY

In accordance with embodiments of the present invention, systems, methods, and computer program products are provided for facilitating the assigning, generating, managing, and distributing of identifiers.

In accordance with an embodiment, a system is provided that comprises a first or default Web service that stores at least one set of pre-generated identifiers. When an identifier request is received, an unused identifier is obtained from the pre-generated set and is marked as used. The identifier is subsequently returned to the requester. For example, a set of identifiers coherently covers a certain number range. If there is more than one set of identifiers, the various sets can cover disjunct (i.e., non-overlapping), number ranges.

The Web service may include a generator for generating the one or more sets of identifiers. Alternatively, an identifier is generated in accordance with a predefined algorithm by the generator when an identifier request is received by the Web service.

In accordance with a further embodiment, a second or replacement Web service is provided. If the default Web service fails, the replacement Web service is addressed by the requesters in order to obtain identifiers. To guarantee uniqueness of the identifiers if the default Web service fails, the provision of identifiers to requesters is mirrored between the default Web service and the replacement Web service. This may be accomplished by reporting the provision of each identifier to a requester from the default Web service to the replacement Web service. As a consequence, seamless handover can occur from the default Web service to the replacement Web service when the default Web service becomes unavailable without corrupting the scheme of providing the unique identifiers.

In accordance with a further embodiment, each requester has a link to the replacement Web service. If the default Web service fulfills a predefined timeout condition, the request is resent from the requester to the replacement Web service. The definition of the replacement Web service may be static and/or a replacement Web service may be determined dynamically when it is required. The selection of such a replacement Web service may be accomplished by means of a Universal Description Discovery Integration (UDDI) registry.

Embodiments of the invention further relate to methods for providing an identifier to a requester. By way of example, a method may be provided that includes sending an identifier request from the requester to a default Web service and returning, from the default Web service, an identifier to the requester, whereby the identifier complies with a predetermined numbering scheme.

In accordance with one embodiment, the identifier request is resent from the requester to a replacement Web service if the default Web service fulfils a timeout condition, such as when no identifier is received from the default Web service in response to the identifier request within a predefined maximum time period from the sending of the identifier request.

In accordance with a further embodiment, the provision of the identifiers from the default Web service to the requesters is mirrored by the replacement Web service. When the default Web service sends an identifier to the requester in response to a respective identifier request, the default Web service sends a copy of the identifier to the replacement Web service. This enables a seamless handover from the default Web service to the replacement Web service when the default Web service becomes unavailable, such as due to a server outage.

In accordance with still another embodiment, the default Web service only sends the identifier to the requester after it has received an acknowledgement from the replacement Web service, whereby the acknowledgement signals that the replacement Web service has received the identifier to be provided to the requester. This has the advantage that an identifier is only provided to a requester when proper mirroring has been confirmed by the replacement Web service.

In accordance with a further embodiment, a consecutive identifier request is only processed after the requester of a previous identifier request has returned an acknowledgement, whereby the acknowledgement signals successful completion of a data processing task that has been performed on the basis of the previously provided identifier.

In accordance with yet another embodiment, consecutive identifier requests are processed immediately by the Web service without having to wait for the requester's acknowledgement. If a respective data processing task of one of the requesters fails, this is signalled to the default Web service. As a consequence, the identifier that was provided for that data processing task is freed again and is put onto an auxiliary list of identifiers. When a consecutive identifier request is received by the default Web service, the identifier from the auxiliary list of identifiers may be reused.

Further embodiments of the invention relate to distributed data processing systems. For example, a distributed data processing system may be provided wherein the Web service for providing the identifiers may be used by the various components of a distributed enterprise resource planning (ERP) system, such as for the coherent and automated provision of unique identifiers, for example, document numbers, posting numbers, invoice numbers, client numbers, part numbers, etc. In particular, embodiments of the present invention can provide a shared service center for providing identifiers to various ERP systems.

Additionally, embodiments of the present invention may provide a continuous chain of identifiers that covers a coherent identifier space, such as a certain number range, as it may be required by the applicable statutory or regulatory provisions, for example, for invoice numbers.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the invention, examples of which are illustrated in the accompanying drawings. The implementation set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
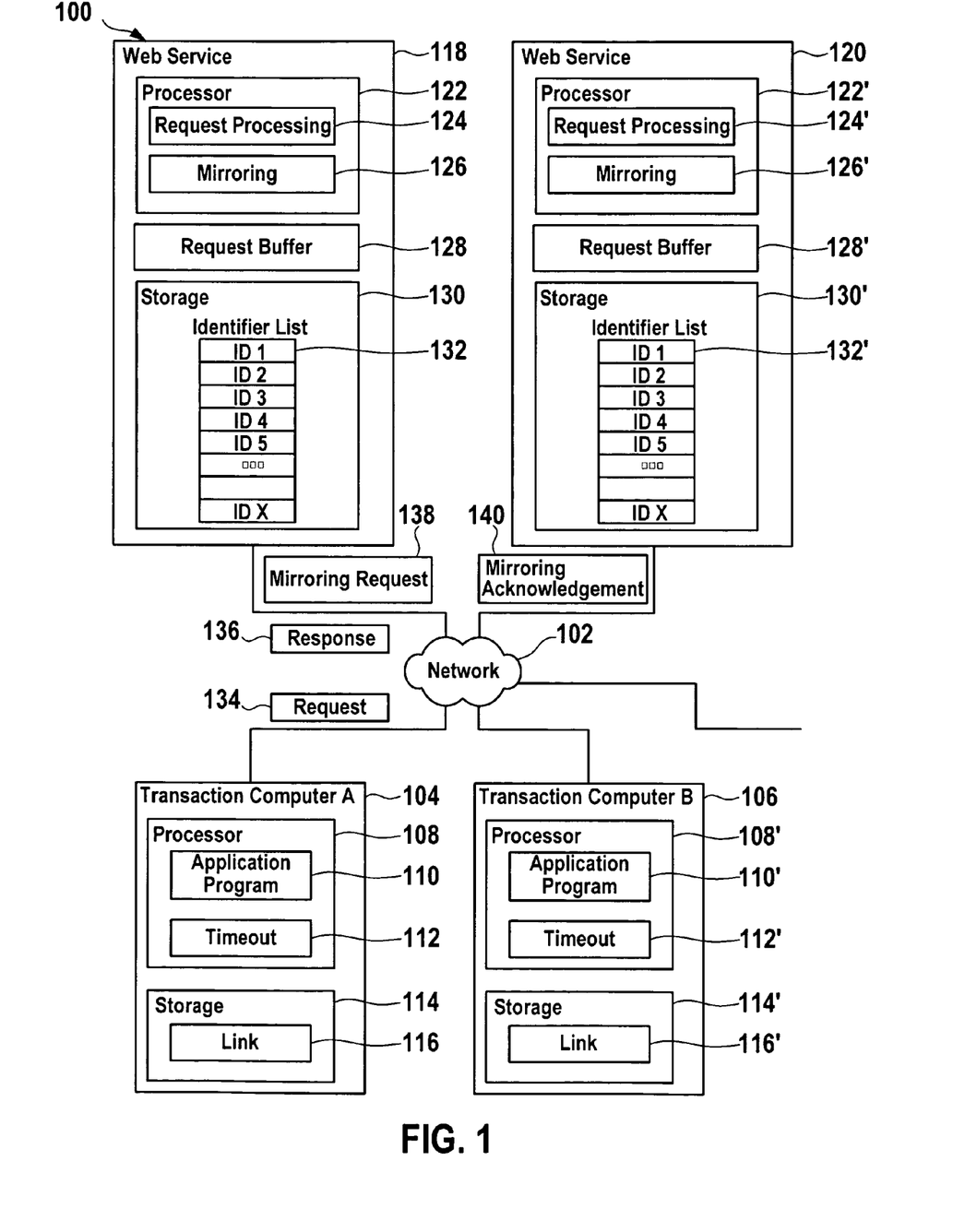
FIG. 1 illustrates a block diagram of an exemplary data processing system, consistent with an embodiment of the present invention.

FIG. 1 shows an exemplary distributed data processing system 100 that includes various components linked by means of a network 102. The network 102 may comprise any combination of networks, including the Internet, an intranet, and/or an extranet.

In the embodiment of FIG. 1, system 100 includes a number of computers 104, 106, . . . that may be used for performing various data processing tasks, such as transactional tasks. For example, the computer 104 may include at least one processor 108 for execution of an application program 110 and a timeout component 112 that serves to determine whether a timeout condition has been met or not. The computer 104 may also include a non-volatile storage component 114 that comprises a storage area 116 for the storage of links to a default Web service 118 and a replacement Web service 120 that are coupled to the network 102. The computer 106 and the other computers coupled to the network 102 may be of similar design.

In one embodiment, the default Web service 118 is used by the various computers 104, 106, . . . that are coupled to the network 102 as the default data processing component for providing identifiers. The default Web service 118 may comprise at least one processor 122 for execution of a request processing program component 124 and a mirroring program component 126. The request processing program component 124 may or may not include a generator for generation of an identifier list and/or individual identifiers.

The default Web service 118 may also comprise a request buffer 128 for buffering consecutive identifier requests and a storage component 130 for storage of one of more identifiers, such as at least one identifier list 132 that has a number of X identifiers covering a certain number range. The replacement Web service 120 may be of similar design as the default Web service 118.

In operation, the application program 110 of the computer 104 generates an identifier request 134, such as for obtaining a document number, posting number, invoice number, transaction number, and/or another identifier that is required for performing a data processing task by the computer 104. The identifier request 134 is sent from the computer 104 to the default Web service 118 via the network 102 using the link to the default Web service 118 that is stored in the storage area 116. Sending of the identifier request 134 from the computer 104 to the default Web service 118 invokes the timeout component 112. For example, a clock is started when the identifier request 134 is sent out. The identifier request may contain data descriptive of the requester. In turn, the requester's data may determine, for example, the number range of the requested identifier. Different number ranges may be defined for various groups of requesters and/or purpose and/or document specific, such as for affiliated companies, years, etc.

Receipt of the identifier request 134 by the default Web service 118 invokes the request processing program component 124 of the default Web service 118. The request processing program component 124 either generates an identifier in response to the identifier request 134 or it reads a previously unused identifier from the identifier list 132. The request processing program component 124 generates a response 136 that contains the identifier. The response 136 is returned to the requesting computer 104 via the network 102.

Other identifier requests that are received by the default Web service 118 after the identifier request 134 from one of the computers 104, 106, . . . are buffered in the request buffer 128. For example, the processing of identifier requests that are buffered in the request buffer 128 and delayed until the provision of the identifier by means of a response 136, is mirrored using the replacement Web service 120.

In accordance with one embodiment, mirroring may be accomplished by generating a mirroring request 138 by the mirroring program component 126. The mirroring request 138 may contain a copy of the identifier that is also contained in the response 136. The mirroring request 138 is sent from the default Web service 118 to the replacement Web service 120, for example, via the network 102. By means of the mirroring request 138, the replacement Web service 120 is updated regarding the status of the default Web service 118 as to the provision of identifiers.

For example, in response to the identifier request 134, the request processing program component 124 reads one of the identifiers from the identifier list 132 that is unused. The request processing program component 124 marks that identifier as "used." When the replacement Web service 120 receives the mirroring request 138 containing that identifier, the mirroring program component 126' marks the same identifier on the identifier list 132' as "used." After the status of the replacement Web service 120 has been updated, a mirroring acknowledgement 140 is generated by the mirroring program component 126' and sent to the default Web service 118 via the network 102. In one implementation, the response 136 is only sent from the default Web service 118 to the requesting computer 104 after the mirroring acknowledgement 140 has been received by the default Web service 118. This ensures that the requested identifier is only provided to the requesting computer 104 after a proper mirroring operation has been completed.

If the computer 104 does not receive the response 136 that contains the requested identifier within a predetermined duration from the sending of the identifier request 134, the timeout component 112 determines that the timeout condition has been met by the default Web service 118. As a consequence, the identifier request 134 is resent from the computer 104 to the replacement Web service 120 using the link to the replacement Web service 120 that is stored in the storage area 116. In this instance, the replacement Web service 120 takes the role of the default Web service 118. In other words, the replacement Web service 120 determines the identifier, generates the response 136, and sends the response 136 to the requesting computer 104.

Figure 2:
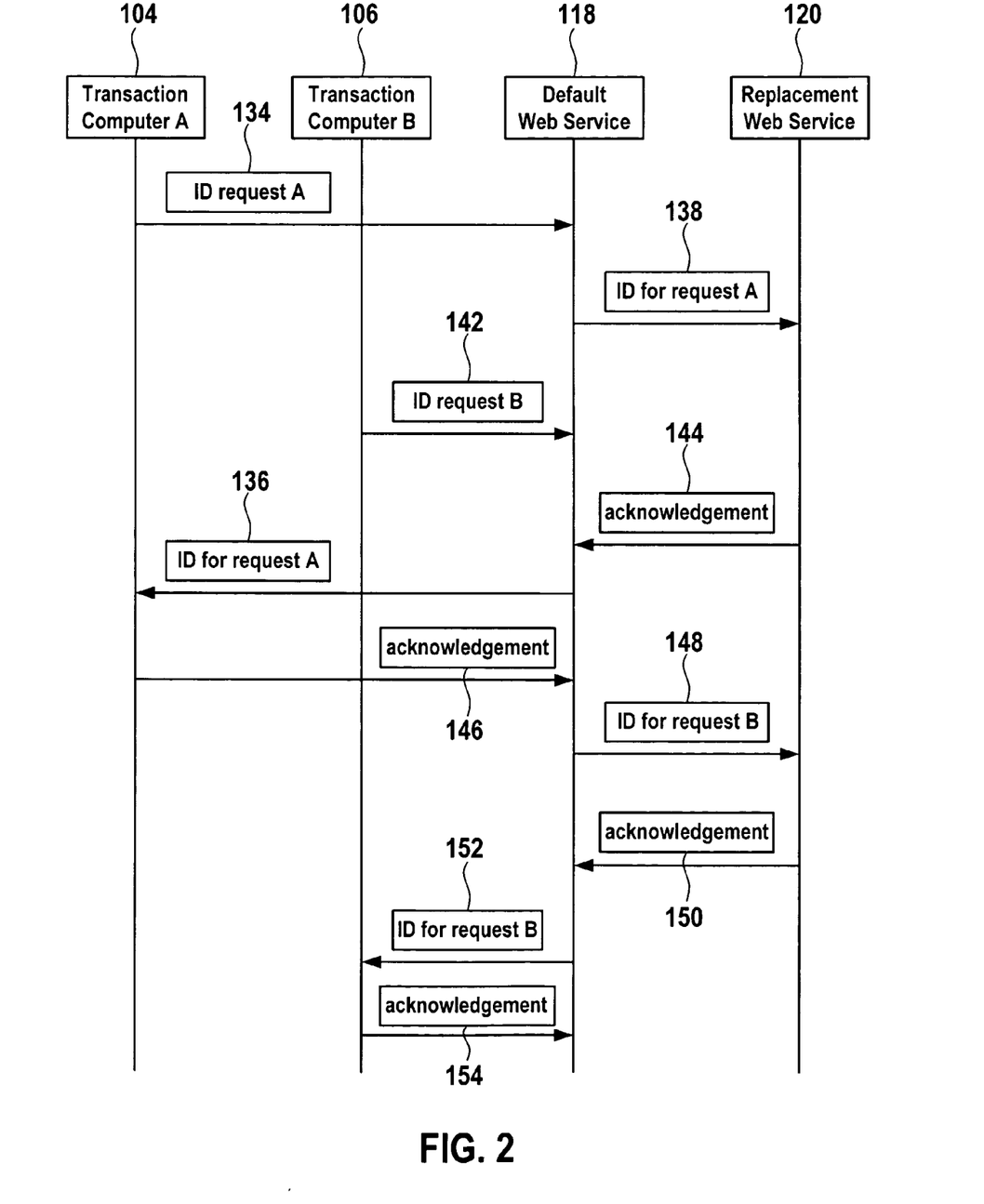
FIG. 2 illustrates a sequence diagram of an operation of the data processing system, consistent with an embodiment of the present invention.

FIG. 2 shows an exemplary sequence diagram for the embodiment of FIG. 1. Initially, the transaction computer A (cf. computer 104 of FIG. 1) generates and sends an identifier request to the default Web service (cf. default Web service 118 and identifier request 134 of FIG. 1). In response, the default Web service determines a respective identifier. The default Web service generates a mirroring request (cf. mirroring request 138 of FIG. 1) that is sent from the default Web service to the replacement Web service (cf. replacement Web service 120 of FIG. 1). After the identifier request 134, the default Web service 118 receives a consecutive identifier request 142 from the computer B 106. As the processing for providing the identifier to the computer A 104 due to the identifier request 134 is still ongoing, the consecutive identifier request 142 is buffered.

In response to the mirroring request 138, the replacement Web service 120 marks the identifier contained in the mirroring request 138 as "used." After this mirroring operation has been performed, the replacement Web service 120 generates a respective acknowledgement 144 that is returned to the default Web service 118.

In response, the default Web service 118 sends its response 136 to the requesting computer A 104 in order to provide the requested identifier. The computer A 104 uses the identifier to perform a data processing task, such as a transaction. After successful completion of the transaction, the computer A 104 generates an acknowledgement 146 and sends the acknowledgement 146 to the default Web service 118 from which it previously received the identifier.

Receipt of the acknowledgement 146 completes the processing of the identifier request 134 as far as the default Web service 118 is concerned. As a consequence, processing of the consecutive identifier request 142 by the default Web service 118 may start.

First, the default Web service 118 determines a respective identifier, such as by reading an unused identifier from its identifier list and marking this identifier as "used" in the identifier list (cf. identifier list 132 of FIG. 1). Next, the default Web service 118 generates a mirroring request 148 that contains this identifier.

The mirroring request 148 is received by the replacement Web service 120 that also marks the respective identifier as 'used'. The replacement Web service 120 provides an acknowledgement 150 to the default Web service 118 in order to acknowledge completion of the mirroring operation. In response, the default Web service 118 sends its response 152 containing the identifier to the computer B 106. The computer B 106 performs the data processing task using the identifier. Upon successful completion of the data processing task, the computer B 106 generates an acknowledgement 154 and sends the acknowledgement to the default Web service 118.

Figure 3:
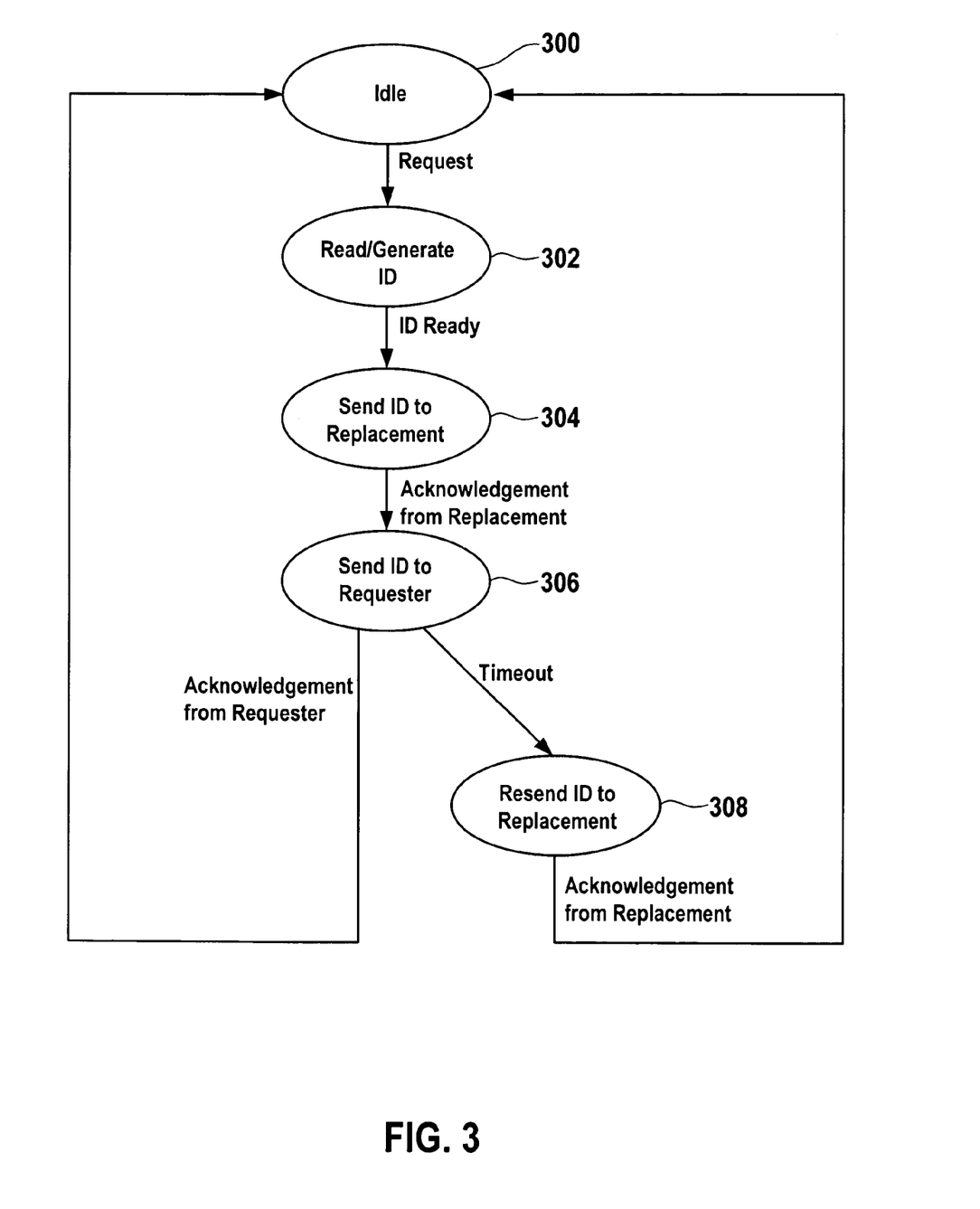
FIG. 3 illustrates a state diagram of an exemplary data processing system, consistent with an embodiment of the present invention.

FIG. 3 shows, in accordance with one embodiment, the corresponding states of the default Web service 118. Initially, the default Web service is in an idle state (state 300). When the default Web service receives an identifier request (e.g., identifier request 134 or 142), it transitions to state 302 where it determines a respective identifier. This may be accomplished by generating the identifier in accordance with a predefined generator algorithm or by reading a pre-generated identifier from an identifier list.

After the identifier has been determined ("ID ready"), the state transitions to state 304 where the identifier is sent to the replacement Web service as part of a mirroring request (cf. mirroring request 138 or 148 of FIGS. 1 and 2). When the default Web service receives an acknowledgement from the replacement Web service that signals completion of the mirroring operation, the state transitions to state 306 where the default Web service sends the identifier to the requester, for example, one of the computers coupled to the network 102 (cf. FIG. 1).

When the default Web service receives an acknowledgement from the requester within a predetermined time limit, the state transitions from state 306 back to the idle state 300. If no acknowledgement is received from the requester before timeout, transition is made to state 308 where the identifier is resent to the replacement Web service.

The resending of the identifier to the replacement Web service in state 308 reverses the mirroring request of state 304 such that the identifier is marked as 'unused' again by both the default Web service and the replacement Web service. When the default Web service receives an acknowledgement from the replacement Web service that signals completion of the reverse mirroring request, a transition is made to the state 300.

Figure 4:
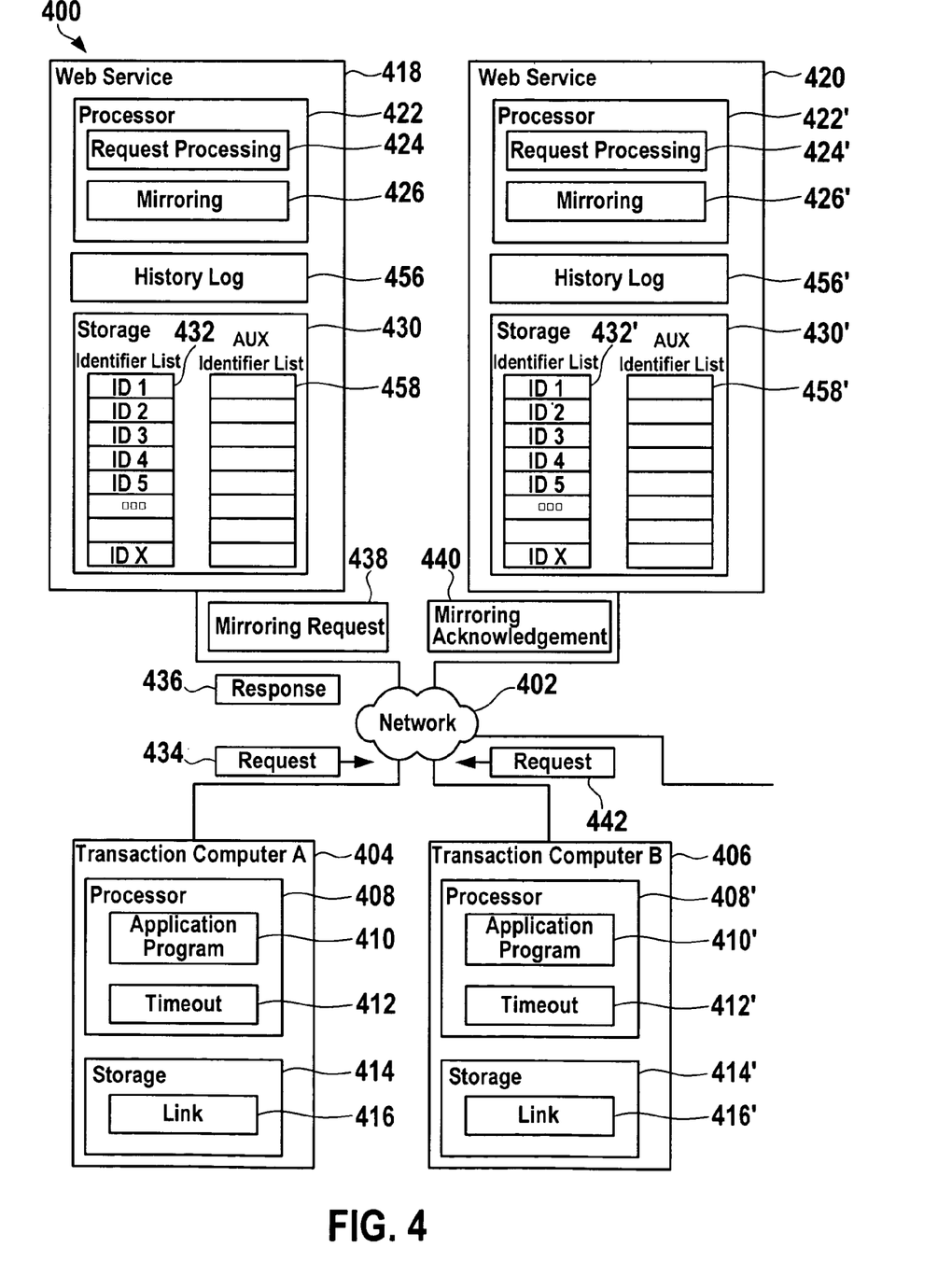
FIG. 4 illustrates a block diagram of another exemplary data processing system, consistent with an embodiment of the present invention.

FIG. 4 shows a block diagram of an alternative embodiment of a data processing system. Elements in the embodiment of FIG. 4 that correspond to elements in the embodiment of FIG. 1 are designated by like reference numerals.

In contrast to the embodiment of FIG. 1, a consecutive identifier request 442 is processed immediately after the identifier request 434 without having to wait for an acknowledgement from the computer A 404 that signals successful completion of the data processing task. In order to avoid corruption of the assignment of identifiers both the default Web service 418 and the replacement Web service 420 have history logs 456 and 456', respectively.

If no acknowledgement, but rather a failure notification signalling failure or unsuccessful completion of the data processing task is received from the computer A 404, the respective identifier is freed again and put on the auxiliary identifier list 458 and/or 458'. When a subsequent identifier request is received, the identifiers from the auxiliary identifier list 458/458' are used up before new identifiers are generated or read from the pre-generated identifier list.

Figure 5:
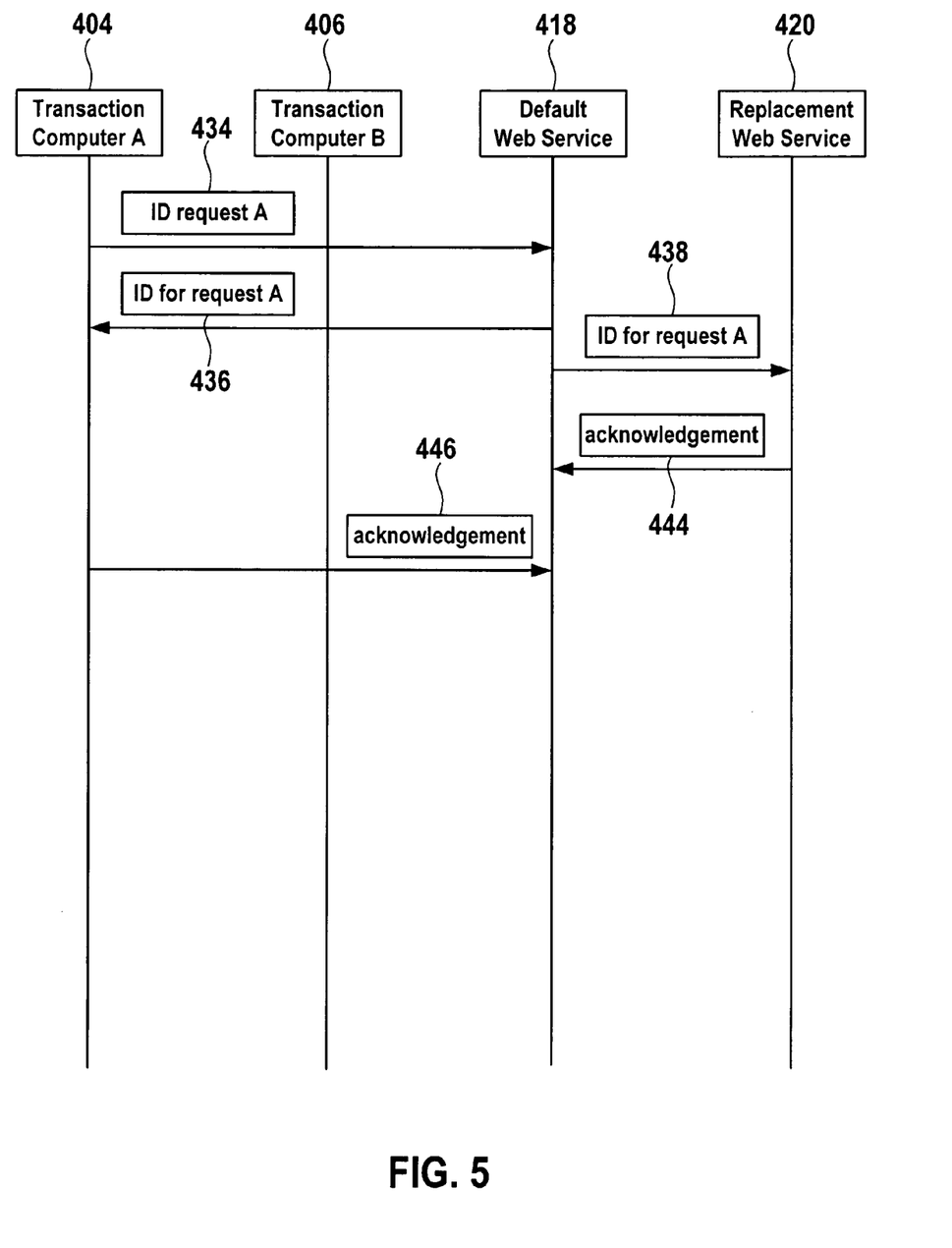
FIG. 5 illustrates a sequence diagram of an alternative mode of operation of an exemplary data processing system, consistent with an embodiment of the present invention.

FIG. 5 shows a respective sequence diagram for the embodiment of FIG. 4. As is apparent from FIG. 5, the response 436 is immediately sent from the default Web service 418 to the requesting computer A 404, irrespective of whether the mirroring operation involving the mirroring request 438 and the acknowledgement 444 have been completed or not. A consecutive identifier request may thus also be processed without delay and without having to wait for any of the acknowledgements 444 and/or 446.

Figure 6:
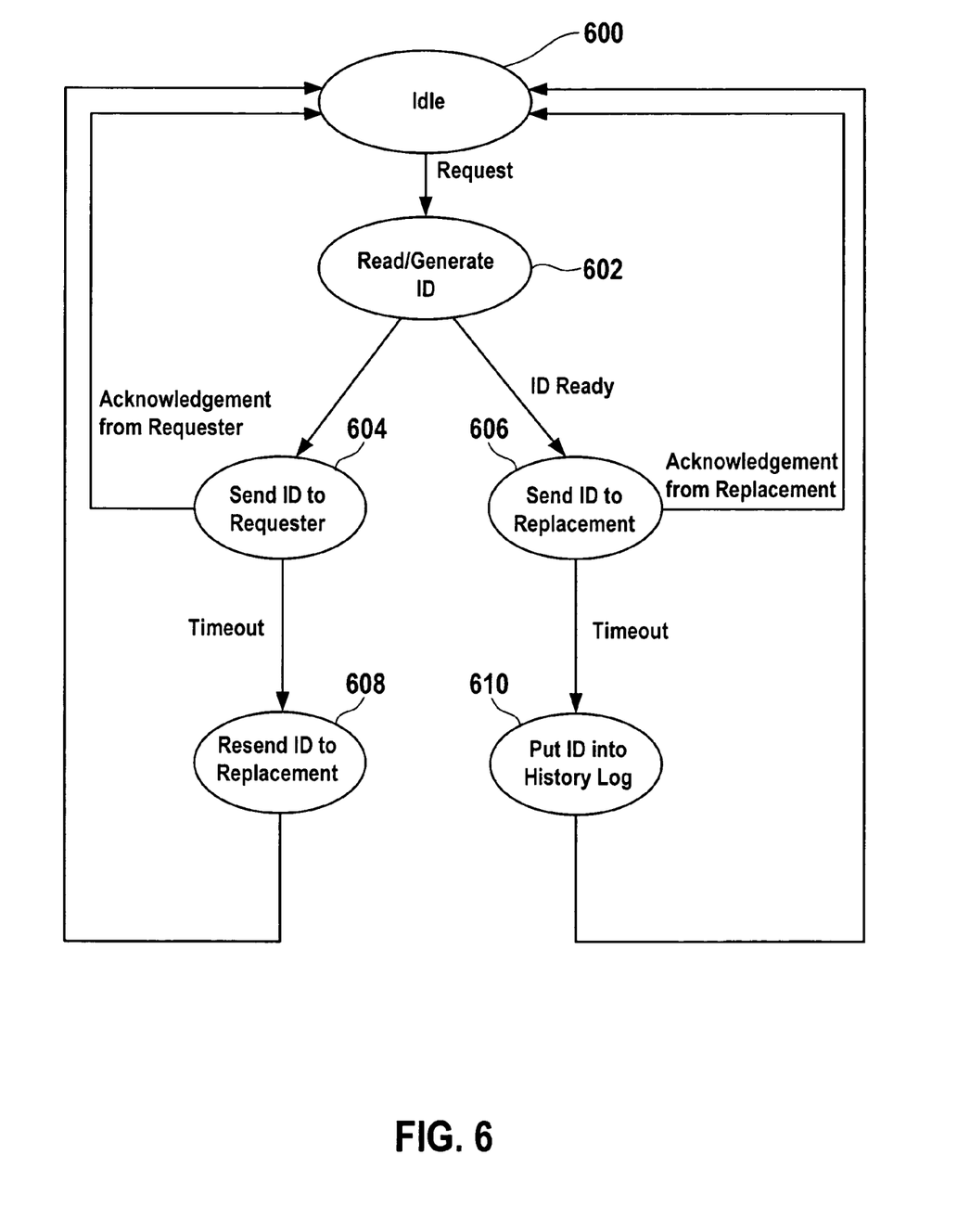
FIG. 6 illustrates an alternative state diagram of the exemplary data processing system, consistent with an embodiment of the present invention.

FIG. 6 shows a corresponding state diagram of the default Web service. Initially, the default Web service is in an idle state (state 600). When the default Web service receives an identifier request, such as identifier request 434, it transitions to state 602 corresponding to state 302 of FIG. 3.

After the determination of the identifier has been completed ("ID ready"), a state transition occurs to states 604 and 606. In state 604, the identifier is returned to the requester, that is, the requesting computer. If an acknowledgement is received from the requester, a state transition occurs from state 604 to state 600.

If, however, no acknowledgement is received from the requester before a timeout condition has been met, the state transitions from state 604 to state 608. In state 608, the identifier is resent to the replacement Web service in order to free the identifier by putting it on the auxiliary identifier list (cf. auxiliary identifier list 458' of FIG. 4). From there the state transitions to state 600.

In state 606, the identifier is sent to the replacement Web service as part of a mirroring request. If an acknowledgement for completion of the mirroring operation is received by the default Web service from the replacement Web service within a predefined time limit, the state returns to state 600. If the contrary is the case, the default Web service keeps the identifier in its history log for later synchronization with the replacement Web service when it becomes available again (state 610).

Figure 7:
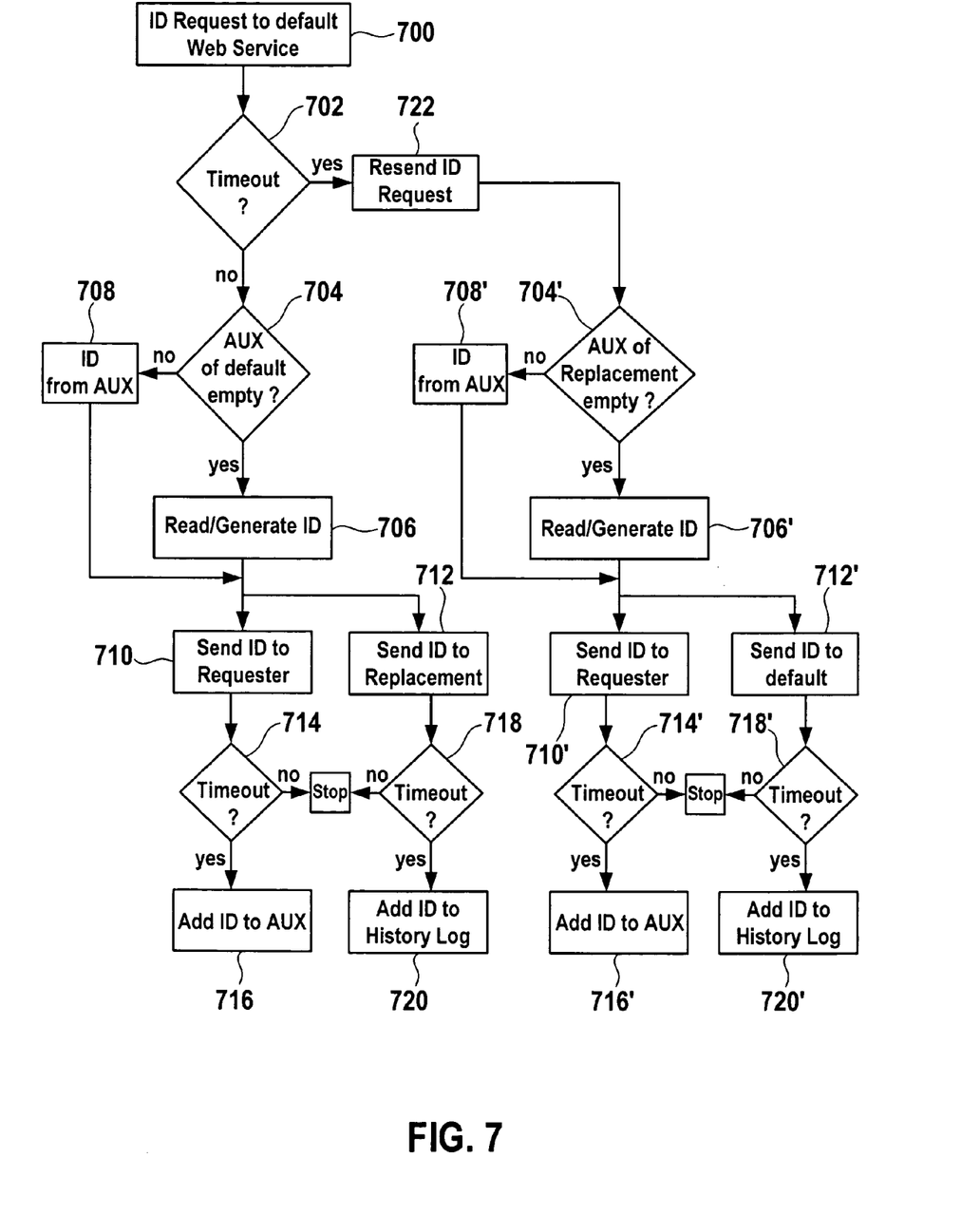
FIG. 7 illustrates a flowchart of an exemplary method, consistent with an embodiment of the invention.

FIG. 7 shows a flowchart illustrating an exemplary method, consistent with an embodiment of the invention. In step 700, an identifier request is received by the default Web service. In step 702, the requester determines whether the default Web service fulfils a timeout condition or not. In other words, the requester determines whether it receives a response containing the requested identifier from the default Web service within a predefined time interval from the sending of the identifier request.

If the timeout condition is not fulfilled, this means that the default Web service is available and the control goes to step 704. In step 704, the default Web service makes a determination whether its auxiliary identifier list (cf. auxiliary identifier list 458 of FIG. 4) is empty. If this is the case, a new identifier is generated or an unused identifier is read from the identifier list (cf. identifier list 432 of FIG. 4) (step 706). If the contrary is the case, the identifier is obtained from the auxiliary identifier list in step 708. The identifier is sent from the default Web service to both the requester (step 710) and the replacement Web service (step 712).

In step 714, the default Web service determines whether it had received an acknowledgement from the requester before a timeout condition has been fulfilled. In other words, the default Web service makes a determination whether the requester has signalled successful completion of a data processing task using the identifier within a predefined time limit. If no such acknowledgement has been received, the timeout condition is fulfilled, and the control goes to step 716 where the identifier is put onto the auxiliary identifier list by the default Web service.

Likewise, in step 718, the default Web service makes a determination whether it received an acknowledgement from the replacement Web service before a timeout condition has been fulfilled. If no such acknowledgement from the replacement Web service acknowledging mirroring of the identifier has been received within the time limit, the identifier is added to the history log of the replacement Web service in step 720 for the purpose of later synchronization of the replacement Web service when it becomes available again.

When a timeout occurred in step 702, the control goes to step 722 in order to resend the identifier request to the replacement Web service. The following steps 704' to 720' are identical to the respective steps 704 to 720 except that they are performed by the replacement Web service rather than by the default Web service.

Figure 8:
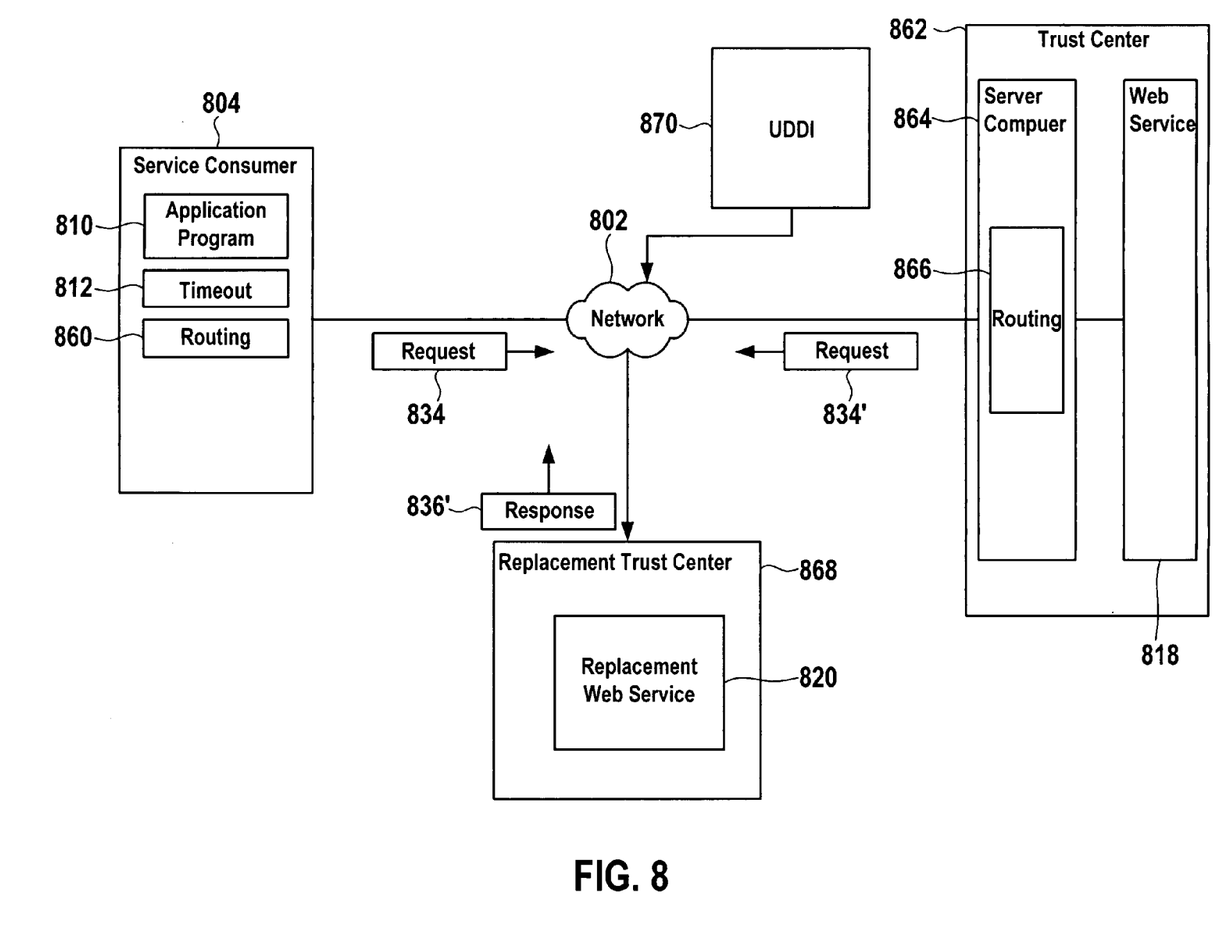
FIG. 8 illustrates a block diagram illustrating another exemplary data processing system where the replacement Web service is determined dynamically, consistent with an embodiment of the present invention.

FIG. 8 shows an alternative embodiment of a data processing system of the invention. Elements in the embodiment of FIG. 8 that correspond to elements in the embodiments of FIGS. 1 and 4 are designated by like reference numerals.

The service consumer 804 has an application program 810, a timeout component 812, and a routing component 860 in order to provide failure resistance in case the trust center 862 that provides the Web service 818 becomes unavailable.

The trust center 862 has a server computer 864 that also has a routing component 866. In normal operation, the server computer 864 receives the identifier request 834 from the service consumer 804 via the network 802 and forwards the identifier request 834 to the Web service 818 that acts as a default service provider for the service consumer 804.

If the default Web service 818 becomes unavailable, for example, due to a hardware and/or software failure or due to downtime required for maintenance purposes, the routing component 866 forwards a request 834' to a replacement trust center 868. The request 834' is identical to the request 834 except that the address of the request 834' has been changed for identification of the replacement trust center 868 as the addressee. The replacement trust center 868 generates a response 836' by means of its replacement Web service 820 that it sends to the service consumer 302 in response to the identifier request 834.

If the service consumer 804 does not receive a response from the trust center 862 or from a replacement trust center 868 within a predefined time window that is set by the timeout component 812, this indicates that not only is the Web service 818 down, but also the server computer 864 and/or the replacement trust center 868. In this instance, the timeout component 812 invokes the routing component 860 of the service consumer 804 such that the service consumer 804 can autonomously identify a replacement trust center to which it resends the identifier request 834.

Each of the routing components 860 and 866 can store one or more links to potential replacement trust centers that provide replacement Web services. In one embodiment, the default Web service and the replacement Web services are described by WSDL (Web Service Description Language) notation stored in WSDL documents.

A WSDL document can be stored in numerous ways such as in a file, in a DB2 XML registry/repository, or in a DB2 based UDDI registry, for example. UDDI (Universal Description, Discovery, Integration) is a protocol for describing Web services such that interested parties may easily discover them. Specifications for the respective UDDI registry 870 and use of WSDL in the registry are available at http://www.uddi.orq/, for example. Service providers can register their services in a UDDI, specifying technical information about how to invoke the service. Often a WSDL document is stored in a UDDI registry in order to define the messages a particular Web services accepts and generates.

The design of UDDI allows trust centers that own Web service enabled applications to publish data about themselves and their services. By providing this information, UDDI implements a simplified form of searching for those interested in locating a particular service in which to fulfil an application process. The conventional UDDI search may focus on a single search criteria such as business name, business location, business categories, business identifier, service type by name, and discovery URL (Uniform Resource Locator).

In operation, the service consumer 804 sends the identifier request 834 to the default Web service 818 provided by the trust center 862. The identifier request 834 is intercepted by the server computer 864. If the Web service 818 is available, the routing component 866 forwards the identifier request 834 to the Web service 818. Otherwise the routing component 866 changes the addressee of the identifier request 834 which provides the identifier request 834' and it resends the identifier request in the form of identifier request 834' to the replacement Web service 820 provided by the replacement trust center 868. Hence, the server computer 864 provides a one stage failure protection against failure of the default Web service 818. If the server computer 864 itself goes down due to a server outage, a second stage is required in order to still ensure that the identifier request 834 can be processed.

The second stage of the failure protection mechanism is constituted by the timeout program component 812 and the routing component 860 of the service consumer 804. If the service consumer 804 does not receive a response from the trust center 862 or a replacement trust center 868 within a predefined time limit, the timeout program component 812 invokes the routing component 860 such that the service consumer 804 autonomously identifies a replacement trust center 868. In this instance, the service consumer 804 resends its identifier request 834 to an identified replacement Web service 820.

Figure 9:
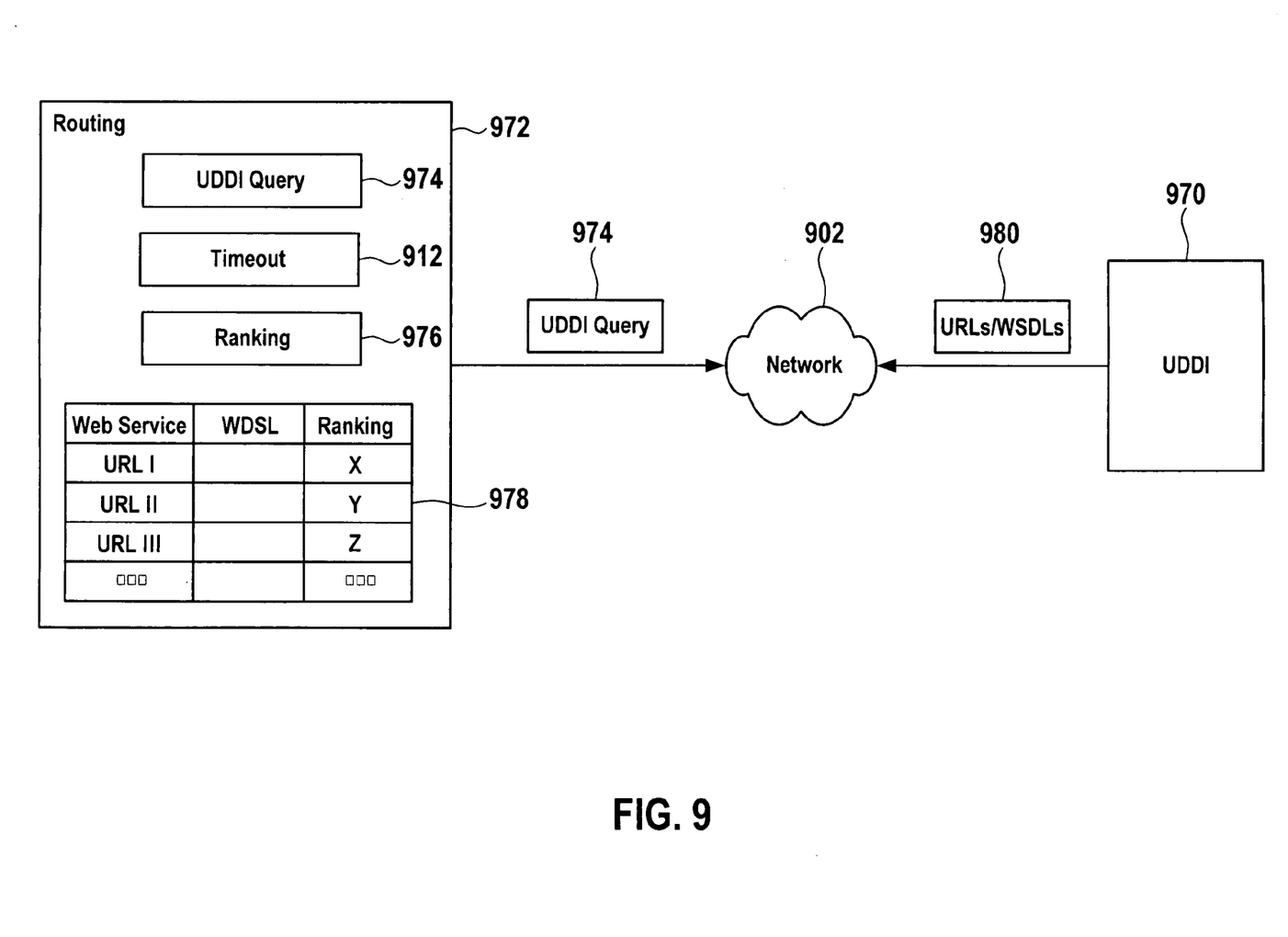
FIG. 9 illustrates a block diagram of an exemplary routing component that can be used for dynamic identification of a replacement Web service, consistent with an embodiment of the present invention.

FIG. 9 illustrates a block diagram of an exemplary electronic apparatus 972 that can be used for implementation of the routing components 860 and/or 866 in the embodiment of FIG. 8. Elements in the embodiment of FIG. 9 that correspond to elements in the embodiments of FIGS. 1, 4, and 8 are designated by like reference numerals.

The electronic apparatus 972 stores a predefined UDDI query 974. It also implements a timeout program component 912 and it has a ranking component 976. Further, the electronic apparatus 972 has storage for storing a table 978.

In operation, the timeout program component 912 is invoked when an identifier request is sent out or is forwarded, such as when the service consumer sends its identifier request to the default Web service or when the server computer forwards an intercepted identifier request to the default Web service. If no response from the default Web service or a replacement Web service is received within a predefined time limit, the timeout program component 912 invokes the following process. First, the UDDI query 974 is sent from the electronic apparatus 972 to the UDDI registry 970 via the network 902. The UDDI registry 970 returns a response 980 that contains the URLs and WSDLs of the Web services registered in the UDDI registry 970 that match the UDDI query 974.

When the electronic apparatus 972 receives the response 980, the ranking component 976 is invoked in order to calculate a ranking value for each of the potential replacement Web services identified in the response 980. The potential replacement Web services are sorted by the ranking values which provides the table 978.

In this example, the response 980 identifies a plurality of potential replacement Web services I, II, III, . . . together with the respective WSDL descriptors. The ranking component 976 calculates a ranking value for each of these Web services, such as a ranking value X for Web service I, ranking value Y for Web service II, ranking value Z for Web service III, etc.

After the table 978 has been generated, the electronic apparatus 972 reads the URL of the highest ranking Web service identified in the table 978. In the example considered here, this is the URL I of the Web service I. The WSDL descriptor of the Web service I is also read from the table 978 in order to transform the original identifier request (cf. request 834 of FIG. 8) into the format that is required by the replacement Web service (cf. request 834' of FIG. 8).

The electronic apparatus 972 sends a transformed identifier request to the replacement Web service. Upon receipt of the Web service response from the replacement Web service, the electronic apparatus 972 transforms the Web service response back into the client domain of the service consumer in order to provide the response in a format that is understandable by the service consumer.

However, if no Web service response is received from the replacement Web service I within a predefined time window specified by the timeout program component 812, the URL and WSDL descriptor of the second highest ranking Web service II is read from the table 978 in order to attempt usage of the replacement Web service II. If the replacement Web service II is also unavailable, an attempt is made to use the next highest ranking Web service III instead, etc.

Figure 10:
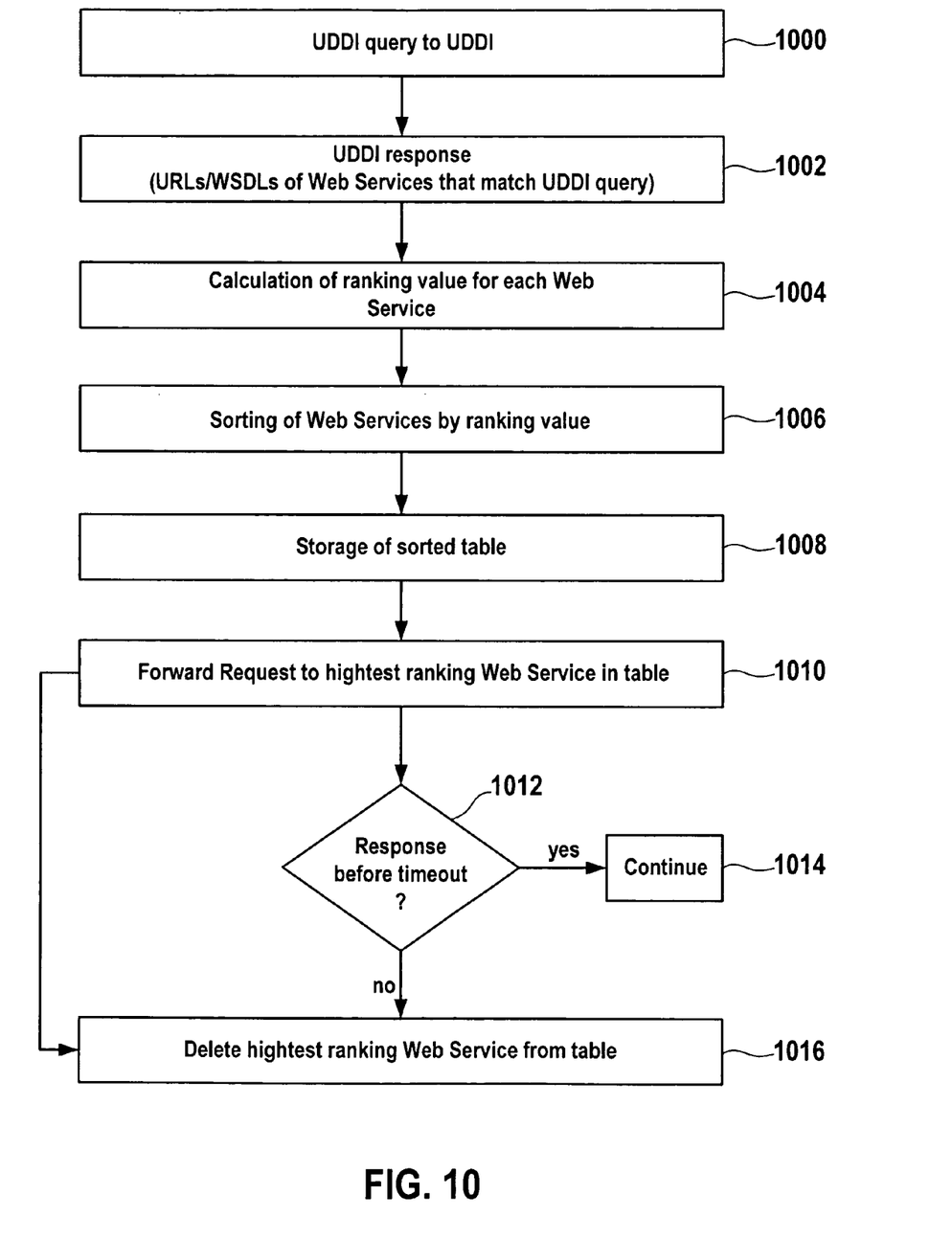
FIG. 10 illustrates a flowchart of an exemplary mode of operation of the routing apparatus, consistent with an embodiment of the present invention.

FIG. 10 illustrates a corresponding flowchart. When a response to an identifier request is not received within a predefined time limit, the UDDI query is sent to the UDDI registry in step 1000. In step 1002, the UDDI response is received which contains an indication of the URLs and WSDLs of potential replacement Web services that have matched the UDDI query. In step 1004, a ranking value for each of the potential replacement Web services contained in the UDDI response is calculated. The ranking value may be calculated for a given potential replacement Web service by evaluating one or more attributes of the Web service, such as the cost of the Web service, the last update of the Web service, and/or other quality criteria. In step 1006, the Web services are sorted by their ranking values in order to provide a sorted table of the potential replacement Web services in step 1008. In step 1010, the original identifier request is transformed into the domain of the highest ranking Web service of the sorted table in accordance with the WSDL of that Web service and the transformed identifier request is forwarded to that Web service.

In step 1012, a determination is made whether a response to the identifier request that has been forwarded in step 1010 is received before a timeout condition has been met. If this is the case, normal operation continues in step 1014. If the opposite is the case, the highest ranking Web service is deleted from the sorted table in step 1016 and the control goes back to step 1010 for a consecutive attempt to use the remaining potential replacement Web services contained in the sorted table.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   a computer for generating an identifier request and transmitting the identifier request to a first Web service stored on a first server;
   a first server for:
      storing the first Web service,
      receiving the identifier request and processing the identifier request using the first Web service,
      sending an identifier to the computer and a copy of the identifier to a second server,
      storing a copy of the identifier sent to the first computer and the second server, and an indication that the identifier has been used,
      receiving a signal from the computer acknowledging receipt of the identifier, and
      when the signal from the computer acknowledging receipt of the identifier is not received by the first server before a timeout condition is met:
         removing the indication that the copy of the identifier has been used; and
         resending the copy of the identifier to the second server; and
   a second server for:
      storing a second Web service,
      storing, by the second Web service, in a storage area of the second server, the copy of the identifier and an indication that the copy of the identifier has been used, and
      removing the indication that the copy of the identifier has been used upon receipt of a duplicate copy of the identifier from the first server.

2. The system of claim 1, wherein the first server comprises a storage component for storage of at least one pre-generated set of identifiers; and
   wherein the identifier that is sent to the computer is obtained from the at least one pre-generated set of identifiers.

3. The system of claim 1, wherein the first server comprises a generator component for generating the identifier.

4. The system of claim 1, wherein the identifier belongs to a specific range associated with the computer.

5. The system of claim 1, wherein the computer has a link to the second Web service.

6. The system of claim 1, wherein the computer comprises means for resending the request to the second Web service when the first Web service becomes unavailable.

7. The system of claim 1, wherein the computer comprises means for selecting the second Web service from a plurality of Web services obtained in response to a predefined Universal Description Discovery Integration (UDDI) query.

8. A computer-implemented method for providing an identifier, the method comprising:
   receiving an identifier request from a first computer, the identifier request being received at a first Web service stored on a second computer;
   processing, by the first Web service, the identifier request;
   sending an identifier to the first computer and a copy of the identifier to a third computer;
   receiving, by the second computer, a signal from the third computer indicating that a second Web service of the third computer has stored, in a storage area of the third computer, the copy of the identifier and an indication that the copy of the identifier has been used;
   storing, in a storage area of the second computer, a copy of the identifier sent to the first computer and the third computer, and an indication that the identifier has been used;
   receiving, by the second computer, a signal from the first computer acknowledging receipt of the identifier;
   removing, by the second computer, the indication that the identifier has been used when the signal to the second computer acknowledging receipt of the identifier is not received by the second computer before a timeout condition is met; and
   resending, by the second computer, the copy of the identifier to the third computer when the signal to the second computer acknowledging receipt of the identifier is not received by the second computer before a timeout condition is met, wherein resending the copy of the identifier to the third computer causes the third computer to remove the indication that the copy of the identifier has been used.

9. The computer-implemented method of claim 8, further comprising receiving, at the third computer, the identifier request from the first computer when a timeout condition has been fulfilled with respect to the second computer.

10. The computer-implemented method of claim 9, wherein the second Web service is selected from a plurality of Web services obtained in response to a predefined Universal Description Discovery Integration (UDDI) query.

11. The computer-implemented method of claim 10, wherein the identifier is one of a document number, transaction number, invoice number, customer number, purchaser number, and order number.

12. The computer-implemented method of claim 8, further comprising:

using the identifier for a transactional data processing task by the first computer;

returning an acknowledgement from the first computer to the first Web service for signalling successful completion of the transactional data processing task; and wherein the first Web service only provides a further identifier in response to a subsequent identifier request after receiving the acknowledgement signalling successful completion of the transactional data processing task.

13. The computer-implemented method of claim 8, further comprising:

using the identifier for performing a transactional data processing task by the first computer;

receiving a subsequent identifier request by the first Web service;

sending a further identifier in response to the subsequent identifier request irrespective of whether an acknowledgement for the successful completion of the transactional data processing task has been received by the first Web service or not; and wherein the identifier is put on an auxiliary identifier list when the acknowledgement signalling successful completion of the transactional data processing task has not been received before a timeout condition is met.

14. A computer-readable medium including program instructions for performing, when executed by a processor, a method for providing an identifier, the method comprising:

receiving an identifier request from a first computer, the identifier request being received at a first Web service stored on a second computer;

processing, by the first Web service, the identifier request;

sending an identifier to the first computer and a copy of the identifier to a third computer;

receiving, by the second computer, a signal from the third computer indicating that a second Web service of the third computer has stored, in a storage area of the third computer, the copy of the identifier and an indication that the copy of the identifier has been used;

storing, in a storage area of the second computer, a copy of the identifier sent to the first computer and the third computer, and an indication that the identifier has been used;

receiving, by the second computer, a signal from the first computer acknowledging receipt of the identifier;

removing, by the second computer, the indication that the identifier has been used when the signal to the second computer acknowledging receipt of the identifier is not received by the second computer before a timeout condition is met; and resending, by the second computer, the copy of the identifier to the third computer when the signal to the second computer acknowledging receipt of the identifier is not received by the second computer before a timeout condition is met, wherein resendinq the copy of the identifier to the third computer causes the third computer to remove the indication that the copy of the identifier has been used.

15. The computer-readable medium of claim 14, wherein the second Web service is selected from a plurality of Web services obtained in response to a predefined Universal Description Discovery Integration (UDDI) query.

\* \* \* \* \*